July 14, 1936. C. Q. IVES Re. 20,034

FABRICATION OF CORRUGATED PAPERS

Original Filed July 13, 1933 2 Sheets-Sheet 1

Inventor
Charles Q. Ives
by Wright, Brown, Quinby & Ray
Attys

July 14, 1936. C. Q. IVES Re. 20,034

FABRICATION OF CORRUGATED PAPERS

Original Filed July 13, 1933 2 Sheets-Sheet 2

Inventor
Charles Q. Ives
by Wright, Brown, Quinby & Tracy
Att'ys

Reissued July 14, 1936 Re. 20,034

UNITED STATES PATENT OFFICE 20,034

FABRICATION OF CORRUGATED PAPERS

Charles Q. Ives, Reading, Mass., assignor to Sherman Paper Products Corporation, Newton, Mass., a corporation of Massachusetts Original No. 1,975,548, dated October 2, 1934, Serial No. 680,268, July 13, 1933. Application for reissue November 18, 1935, Serial No. 50,406

6 Claims. (Cl. 154—55)

This invention relates to the fabrication of corrugated paper such as is designed more particularly for wrapping purposes and such as includes not only a corrugated paper ply but a plane or flat paper ply or other flexible fabric adhesively or otherwise secured as a reinforcing facing on either or both surfaces of the corrugated ply.

Corrugated paper of the foregoing class is valued either by virtue of the stiffness or rigidity and/or by the resiliency or cushioning action afforded by the corrugations. When such paper is used as a wrapper encompassing in three directions bodies or packages of rectilinear and curvilinear outline, it is quite difficult to flex such paper across its corrugations so as to make it lie smoothly against or hug smoothly the corners or curved areas since flexure across the corrugations is resisted by the stiffness inhering in the corrugations especially when so-called "Bedford" paper or the usual heavy wrapping paper serves in making the corrugated ply.

In accordance with the present invention, I realize the desired degree of flexibility or pliability in such corrugated paper by creating depressions or recesses in the corrugations inwardly toward the plane paper ply along lines intersecting or crossing the corrugations at closely spaced intervals but not so close as to destroy the essentially corrugated nature of the sheet and the resiliency or cushioning action afforded thereby. The preferred arrangement of depressions or recesses in the corrugations is along-criss-crossing lines running diagonally across the corrugations, preferably running at angles of substantially 45° thereto. Corrugated paper made in this latter way flexes extremely well not only along lines parallel to its corrugations, but also along lines crossing the corrugations at all angles. It is hence admirably adapted for use as a wrapping paper when it is desired to protect the object or package being wrapped and at the same time to realize a nice conformation of the wrapper about the object such as makes for neat appearance.

With the foregoing and other features and objects in view, I shall now describe my invention with particular reference to the accompanying drawings, wherein,—

In making the corrugated paper of the present invention, I can use the usual machine which is equipped to corrugate a sheet of paper as it is being fed progressively from a supply roll and which is further equipped to secure a plane sheet of paper adhesively as a facing to a surface of the corrugated sheet. Indeed, the only modification necessary in the usual machine is to provide it with one or more creasing rolls for progressively rolling the corrugations locally inwardly toward the plane paper facing along the desired predetermined lines before the corrugated paper is accumulated as a roll.

Figure 1:
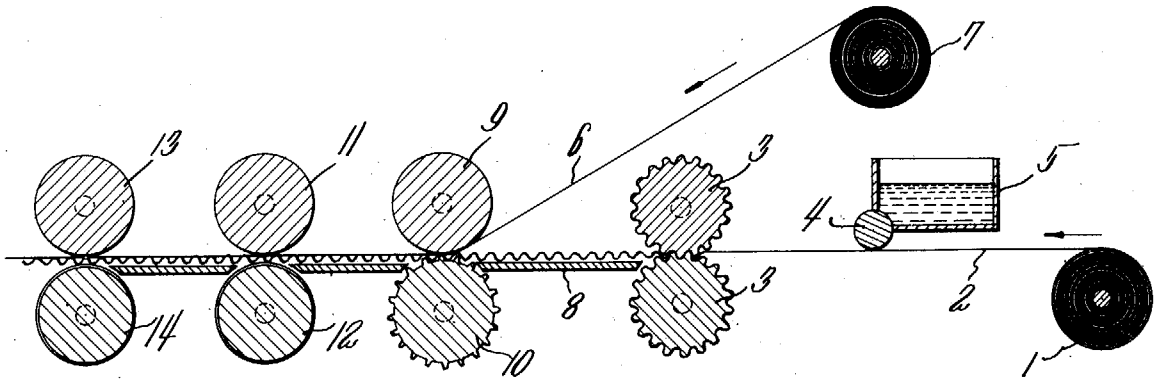
Figure 1 represents somewhat diagrammatically and conventionally a machine on which corrugated paper may be fabricated in accordance with my invention.
Figure 5:
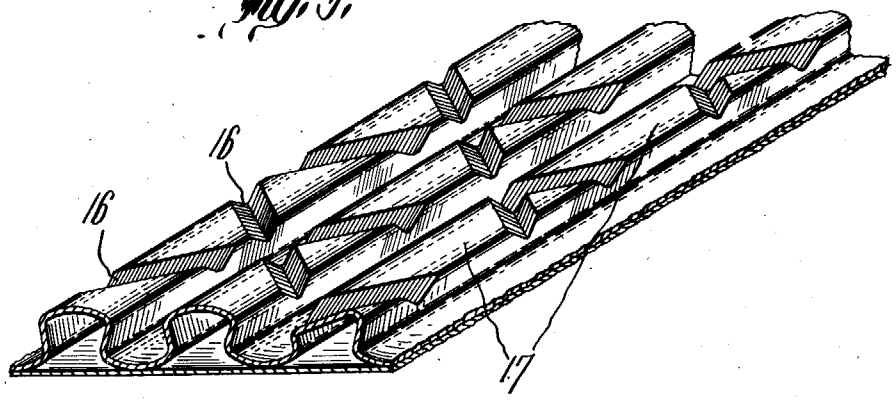
Figure 5 shows in enlarged perspective a fragment of the finished paper.
Figure 4:
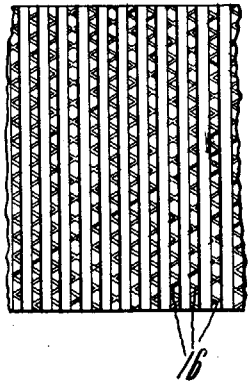
Figure 4 is a plan view of a fragment of the finished paper.

Referring first to Figure 1 of the drawings, 1 represents a roll of "Bedford" or other paper or paperboard suitable for use as the corrugated ply. The paper sheet 2 is shown as being progressively unwound from the roll 1 and being passed into the nip of a pair of corrugating rolls 3. As illustrated, while the paper is on its way to the corrugating rolls, it receives a coating of adhesive on its upper surface from a "kissing" roll 4, part of whose periphery rotates in contact with a bath of adhesive in a supply box 5. The adhesive may be of the usual aqueous variety, e. g., a glue, starch, dextrin, or similar aqueous solution, or an aqueous dispersion of rubber (e. g., latex), asphalt, or similar adhesive suspended as fine particles in the watery vehicle and stabilized, if need be, by soap, colloidal clay, or similar protective colloid. The application of such adhesive prior to corrugation makes for pliancy or plasticity in the paper sheet such as conduces to an effective corrugating action particularly when the corrugating rolls are run sufficiently hot to dewater the adhesive partially and thus to stiffen the sheet in its corrugated form while leaving sufficient tackiness in the adhesive coating to ensure the bonding action desired when a plane paper ply is pressed into contact therewith. The plane paper ply 6 may be unwound from a supply roll 7 and superposed under pressure on the adhesive-coated face of the corrugated paper ply. As shown, the corrugated paper ply passes from the corrugating rolls 3 over a support or table 8 into the nip of a pair of rolls, the upper roll 9 of which has a smooth periphery and serves as the press roll, and the lower roll 10 of which has a longitudinally ribbed periphery corresponding in profile with the corrugations in the paper and serves as a base roll into the recesses of which the corrugations enter and are thus kept from being flattened out by the pressing action of the upper roll 9. The plane paper ply is, as shown, superposed over the corrugated ply as both plies are led into the nip of the rolls 9 and 10 where they are pressed together into bonded relationship while preserving substantially intact the corrugations of the corrugated ply. The composite sheet is then led into the nips of spaced, successive pairs of rolls 11 and 12, and 13 and 14, respectively. The upper rolls, 11 and 13, of these pairs are provided with smooth peripheries, whereas the lower rolls, 12 and 14, have creasing knives or ribs 15 projecting from their peripheries. The creasing knives on both lower rolls run diagonally, preferably at angles of substantially 45°, of the corrugations in the corrugated paper ply, with the knives on the roll 12 running diagonally in spaced parallel relationship in one direction and the knives on the roll 14 running diagonally in spaced parallel relationship in an opposite direction. This means that the corrugations in the corrugated ply will be rolled or broken down locally inwardly toward the plane paper facing along criss-crossing lines 16 running diagonally across the corrugations, as best shown in Figures 4 and 5. The parallel lines of recesses or depressions preferably occur in the corrugations at closely spaced intervals, but sufficient intact rib portions 17 should be left in the corrugated paper ply, as appears in Figure 5, to preserve the essentially corrugated nature of this ply. Thus, by leaving a space of, say, $\frac{3}{16}$ to $\frac{3}{8}$ inches, between the parallel lines of recesses or depressions, the particular spacing within this range depending upon the character of the paper of the corrugated ply, it is possible to arrive at the flexibility desired in the finished product while at the same time realizing the resiliency or cushioning action desired therein.

Figure 2:
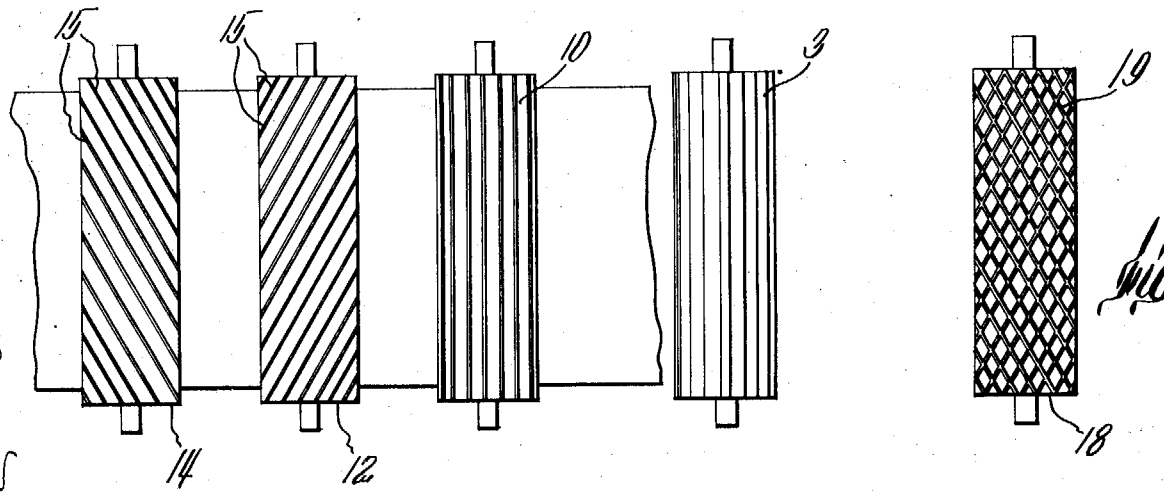
Figure 2 is a bottom plan view of part of the machine.
Figure 3:
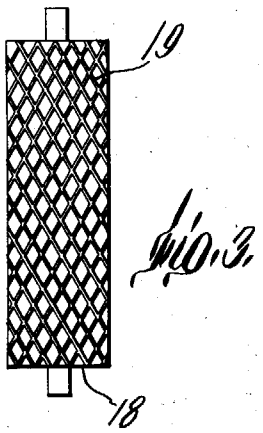
Figure 3 is a plan view of a roll capable of effecting all the creasing desired in the corrugated paper.

Rather than using a pair of creasing rolls, as shown in Figures 1 and 2, it is possible to effect the desired creasing action in the corrugated ply by a single creasing roll 18 shown in Figure 3. This roll has creasing knives or ribs 19 arranged on its periphery in criss-crossing relationship so as to constitute in effect a combination or composite assembly of the knives used on both the rolls 12 and 14.

The corrugated two-ply sheet made as illustrated in Figures 1 and 2 may be accumulated in rolls and constitutes a highly desirable form of single-faced corrugated paper for wrapping purposes. In some instances, however, the corrugated ply may be faced on both surfaces with plane paper plies adhesively secured thereto, although this detracts from the flexibility of the finished product. When a three-ply product is to be made in accordance with my invention, a second plane paper ply may be adhesively secured to the lower face of the composite sheet issuing from the second pair of creasing rolls 13 and 14.

It is, of course, possible to effect modifications in the product and the practice constituting my invention without departing from the principles thereof. For example, rather than using a plane paper facing for the corrugated paper ply, flexibilized accordant with my invention, it is possible to use other flexible, reinforcing fabrics, including textile fabrics, such as cheesecloth, linen, etc., papers of a crinkled or creped nature, and even similarly flexibilized corrugated paper. In speaking about creating the recesses in the corrugations along lines intersecting the corrugations, I wish to have it understood that the lines of recesses may be zig-zag, curved, or possessed of any other suitable configuration or combination of configurations productive of the desired results even though I prefer the criss-crossing lines of recesses running diagonally across the corrugations and at angles of substantially 45° thereto. While it is preferable, as hereinbefore described, to create the recesses in the corrugations after the corrugated paper sheet has been faced by a reinforcing ply so that the recesses extend inwardly toward the reinforcing ply, nevertheless it is possible to create such recesses before the corrugated paper sheet has been reinforced, in which case one may thus proceed to reinforce the corrugated paper sheet with a reinforcing ply in such a way that the recesses occur in the corrugations next to the reinforcing ply and thus extend outwardly from the reinforcing ply as well as to produce a finished product such as has already been described. In securing the corrugated ply to the reinforcing ply, it is possible to effect such securement quickly and economically by the use of adhesives, although one may resort to such expedients as stitching especially when the reinforcing ply is a textile fabric such as cheesecloth, linen, etc.

I claim:—

1. A corrugated paper faced on at least one surface with a flexible, reinforcing fabric ply adhesively secured thereto, the corrugations of said corrugated paper being recessed along criss-crossing lines running diagonally across said corrugations.

2. A corrugated paper faced on at least one surface with a flexible, reinforcing fabric ply adhesively secured thereto, the corrugations of said corrugated paper being recessed along criss-crossing lines running diagonally across said corrugations and at angles of substantially 45° thereto.

3. A corrugated paper faced on one surface with a plane paper ply adhesively secured thereto, the corrugations of said corrugated paper being recessed inwardly toward said plane paper ply along criss-crossing lines running diagonally across said corrugations.

4. A corrugated paper faced on one surface with a plane paper ply adhesively secured thereto, the corrugations of said corrugated paper being recessed inwardly toward said plane paper ply along criss-crossing lines running diagonally across said corrugations and at angles of substantially 45° thereto.

5. A wrapping material comprising a corrugated sheet flexible along lines parallel to its corrugations, which is faced on at least one surface with a flexible, reinforcing ply and whose corrugations are broken down and recessed along lines intersecting said corrugations at spaced intervals ranging from substantially $\frac{3}{16}$ to $\frac{3}{8}$'' and recurring with substantial uniformity throughout all of said corrugations, said spacing range and substantial uniformity of recurrence of breakdown in said corrugations being sufficient to impart flexibility to said material along lines crossing its corrugations as well as along lines parallel to its corrugations.

6. A wrapping paper comprising a corrugated paper sheet flexible along lines parallel to its corrugations, which is faced on at least one surface with a flexible, reinforcing, paper ply and whose corrugations are broken down and recessed along lines intersecting said corrugations at spaced intervals ranging from substantially $\frac{3}{16}$ to $\frac{3}{8}$'' and recurring with substantial uniformity throughout all of said corrugations, said spacing range and substantial uniformity of recurrence of breakdown in said corrugations being sufficient to impart flexibility to said material along lines crossing its corrugations as well as along lines parallel to its corrugations.

CHARLES Q. IVES.